UNITED STATES PATENT OFFICE.

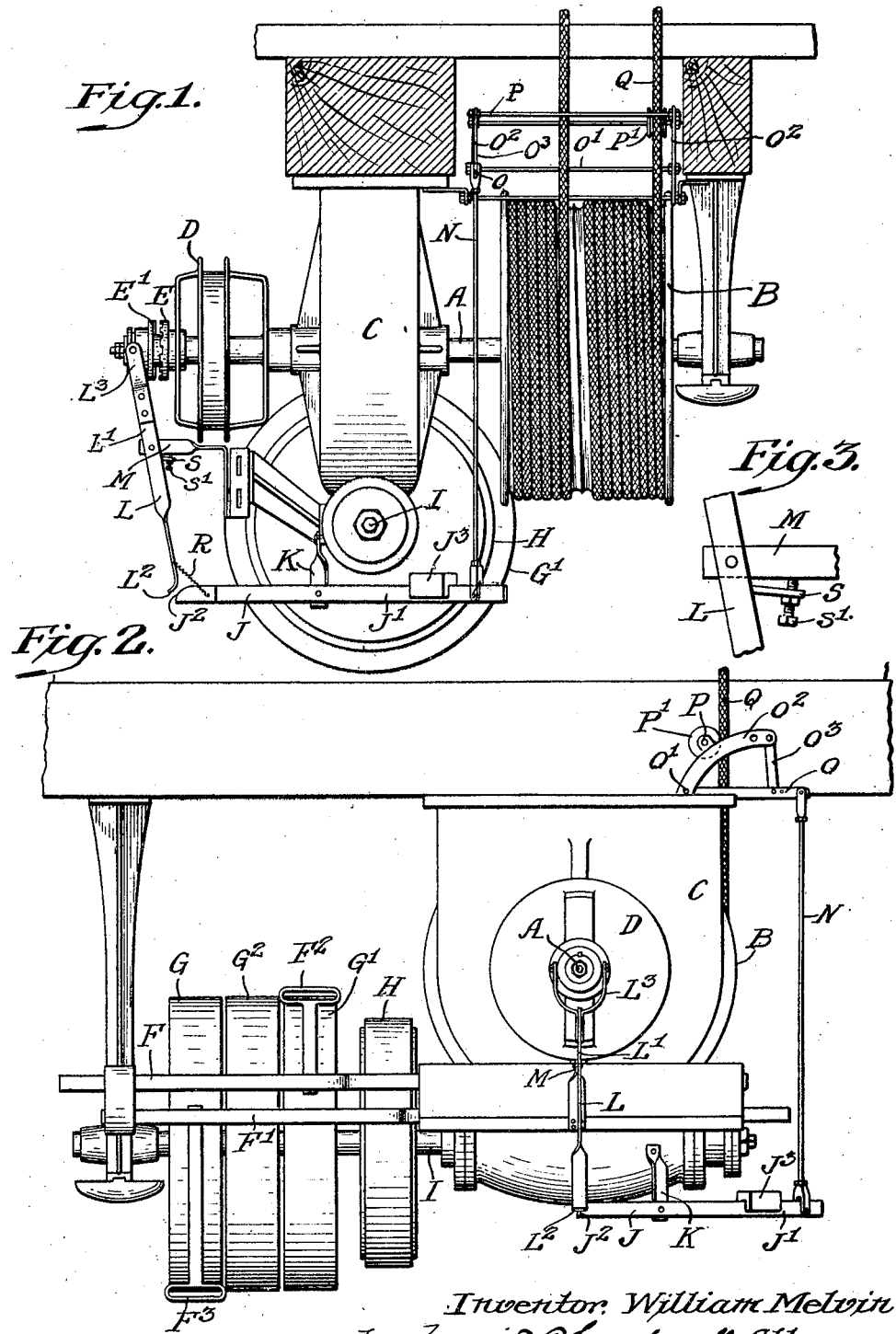

WILLIAM MELVIN, OF WILMINGTON, DELAWARE.

SAFETY MECHANISM FOR ELEVATORS.

1,375,227.   Specification of Letters Patent.   Patented Apr. 19, 1921.

Application filed September 22, 1920. Serial No. 411,898.

*To all whom it may concern:*

Be it known that I, WILLIAM MELVIN, a citizen of the United States of America, and resident of Wilmington, in the county of New Castle, in the State of Delaware, have invented a certain new and useful Improvement in Safety Mechanism for Elevators, of which the following is a true and exact description, reference being had to the accompanying drawings, which form a part thereof.

My invention relates to mechanism intended to automatically stop the motion of the winding drum in case of the breaking or slackening of the cable and the object of my invention is to provide a simple and highly efficient mechanism for this purpose. The nature of my improvements will be best understood as described in connection with the drawings in which they are illustrated and in which Figure 1 is an elevation showing the winding drum and coacting mechanism and in connection therewith my improved safety device.

Fig. 2 is an elevation taken at right angles to Fig. 1 showing the same mechanism, and Fig. 3 is an enlarged detail.

A is the shaft to which the winding drum B is secured, C, a casing containing a worm gear attached to the shaft A. D indicates the actuating pulley by which the belts are shifted and the break applied and disconnected. E is a clutch member secured to the pulley D and E' a coacting clutch member keyed on the shaft A and movable in contact with the member E. F and F' indicate sliding bars actuated through the pulley D by mechanism not shown and carrying the belt shifting forks $F^2$ and $F^3$. G, G' and $G^2$ are the fast and loose pulleys and H the break cylinder attached to the driving shaft I. The mechanism above referred to is of a familiar type used in connection with the Otis elevators and it is not thought necessary, therefore, to show or describe them in greater detail.

J, J' is a lever pivoted on the bracket K and having a curved contact end indicated at $J^2$ at the end of its arm J and a weight $J^3$ adjustable on its arm J'. L, L' is a clutch actuating lever pivoted on the bracket M and having a curved contact end $L^2$ on the end of its arm L and a fork $L^3$ at the end of its arm L' which engages the clutch member E'. S is a bracket extending out from the arm L of the lever L, L' which is threaded to receive an adjusting screw S' the end of which abuts against the bracket M. R indicates one or more spiral springs, preferably two, which are attached to the lever arms J and L and which act to retract the lever L, L', and hold the adjusting screw S' against the bracket M. N is a rod pivotally attached to the arm J' of the lever J, J', and to the end of a lever O pivoted on a rod O' which extends across in front of the winding drum to the lever O and to a similar lever at the other end of the rod O' are attached arms $O^2$ the upper ends of which are connected with the levers O by members $O^3$. The rods or bars $O^2$ support a shaft P on which is slidingly journaled a grooved wheel P' which normally rests in contact with the cable Q running upward from the drum.

In operation it will be seen that the lever O is supported by the contact of the grooved wheel P' with the cable Q and held in a horizontal position indicated in Fig. 2 through the rod N attached to its end which supports the weighted end of the lever J, J', which will be held in substantially horizontal position. The spiral springs R hold the curved end $J^2$ of the lever arm J and $L^2$ of the lever arm L nearly but not quite in contact and these springs press the stop screw S' against the bracket M and hold the movable clutch member E' at a proper distance from the fixed clutch member, this distance being adjustable by manipulating the screw S'. In case of the breaking or slackening of the cable Q the lever O is free to move downward and permit the weighted lever arm J' to move downward, raising the arm J and bringing its curved end $J^2$ into contact with the curved end of the lever L, L' with the result of engaging the clutch members and operating the pulley D to arrest the motion of the drum. It is a marked advantageous feature of my construction that the levers J, J', and L, L', are not directly connected with each other and that the normal position of the lever L, L', can be adjusted without movement of the lever J, J', and also the clutch actuating lever L, L', can at any time be engaged to move the clutch and adjust its operativeness. It will be observed that the clutch in my construction is well removed from the parts of the apparatus where dirt and grease will be apt to be thrown upon it.

Having now described my invention what I claim as new and desire to secure by Letters Patent, is:

1. A safety device for elevators comprising mechanism for shifting the belts to neutral position, a clutch member secured to said device, a sliding clutch member rotating with the drum, a lever for actuating said clutch member yieldingly held in non-operative position, a weighted lever for actuating the clutch lever with its working end located in such relation to the clutch lever that its upward movement will contact with and actuate the clutch lever to engage the clutch members and means for holding the weighted lever in non-operative position including a supporting lever normally supported by contact with the taut elevator cable and free to drop when the cable breaks or slackens.

2. A safety device for elevators comprising mechanism for shifting the belts to neutral position, a clutch member secured to said device, a sliding clutch member rotating with the drum, a lever for actuating said clutch member yieldingly held in non-operative position, means for adjusting the angular position of the clutch lever and through it the sliding clutch member, a weighted lever for actuating the clutch lever with its working end located in such relation to the clutch lever that its upward movement will contact with and actuate the clutch lever to engage the clutch members and means for holding the weighted lever in non-operative position including a supporting lever normally supported by contact with the taut elevator cable and free to drop when the cable breaks or slackens.

3. A safety device for elevators comprising mechanism for shifting the belts to neutral position, a clutch member secured to said device, a sliding clutch member rotating with the drum, a lever for actuating said clutch member yieldingly held in non-operative position, and having a curved lower end, a weighted lever for actuating the clutch lever with its working end curved and located in such relation to the clutch lever that its upward movement will contact with and actuate the clutch lever to engage the clutch members and means for holding the weighted lever in non-operative position including a supporting lever normally supported by contact with the taut elevator cable and free to drop when the cable breaks or slackens.

4. A safety device for elevators comprising mechanism for shifting the belts to neutral position, a clutch member secured to said device, a sliding clutch member rotating with the drum, a lever for actuating said clutch member, a weighted lever for actuating the clutch lever with its working end located in such relation to the clutch lever that its upward movement will contact with and actuate the clutch lever to engage the clutch members, one or more spiral springs connecting the adjacent ends of the clutch and weighted levers and means for holding the weighted lever in non-operative position including a supporting lever normally supported by contact with the taut elevator cable and free to drop when the cable breaks or slackens.

5. A safety device for elevators comprising mechanism for shifting the belts to neutral position, a clutch member secured to said device, a sliding clutch member rotating with the drum, a lever for actuating said clutch member yieldingly held in non-operative position, a weighted lever for actuating the clutch lever with its working end located in such relation to the clutch lever that its upward movement will contact with and actuate the clutch lever to engage the clutch members, a lever for supporting the weighted end of the weighted lever and means for holding said lever in horizontal position including a contact roll resting against the elevator cable.

WILLIAM MELVIN.